(12) United States Patent
Gallant et al.

(10) Patent No.: US 7,461,437 B2
(45) Date of Patent: Dec. 9, 2008

(54) ARTICLES AND METHODS OF THEIR FORMATION

(75) Inventors: Christopher M. Gallant, Nottingham, NH (US); Gregory A. Carr, Nashua, NH (US); Howard A. Kingsford, Amherst, NH (US)

(73) Assignee: Velcro Industries B.V., Curacao (AN)

( * ) Notice: Subject to any disclaimer, the term of this patent is extended or adjusted under 35 U.S.C. 154(b) by 0 days.

(21) Appl. No.: 10/989,336

(22) Filed: Nov. 15, 2004

(65) Prior Publication Data

US 2006/0101626 A1    May 18, 2006

(51) Int. Cl.
A44B 1/04    (2006.01)

(52) U.S. Cl. .............................. 24/442; 24/452; 428/100

(58) Field of Classification Search .................... 24/442, 24/254, 252, 449, 444, 452
See application file for complete search history.

(56) References Cited

U.S. PATENT DOCUMENTS

| | | |
|---|---|---|
| 3,590,109 A | 6/1971 | Doleman et al. |
| 3,752,619 A | 8/1973 | Manzin et al. |
| 3,870,741 A | 3/1975 | Kuhn |
| 3,874,833 A | 4/1975 | Ancker |
| 4,198,734 A | 4/1980 | Brumlik |
| 4,470,857 A | 9/1984 | Casalou |
| 5,260,015 A | 11/1993 | Kennedy et al. |
| 5,392,498 A * | 2/1995 | Goulait et al. ................. 24/452 |
| 5,441,687 A | 8/1995 | Murasaki et al. |
| 5,691,021 A * | 11/1997 | Kobe ......................... 428/40.1 |
| 5,695,845 A * | 12/1997 | Ogawa et al. ................. 428/93 |
| 5,744,080 A | 4/1998 | Kennedy et al. |
| 5,819,391 A * | 10/1998 | Matsushima et al. .......... 24/452 |
| 5,945,193 A * | 8/1999 | Pollard et al. ............... 428/100 |
| 6,737,147 B2 | 5/2004 | Kennedy et al. |
| 6,746,434 B2 * | 6/2004 | Johnson et al. ........ 604/385.01 |
| 6,746,747 B2 * | 6/2004 | Davies et al. ............... 428/113 |
| 2002/0060849 A1 | 5/2002 | Matsunaga et al. |
| 2003/0085485 A1 | 5/2003 | Seidel et al. |
| 2004/0187275 A1 | 9/2004 | Kennedy et al. |
| 2005/0097713 A1 | 5/2005 | Ausen et al. |

FOREIGN PATENT DOCUMENTS

| | | |
|---|---|---|
| EP | 1312465 | 5/2003 |
| EP | 1662928 | 6/2006 |
| WO | WO2004093591 | 11/2004 |
| WO | WO2005027676 | 3/2005 |

\* cited by examiner

*Primary Examiner*—William L. Miller
(74) *Attorney, Agent, or Firm*—Fish & Richardson P.C.

(57) ABSTRACT

A fastener product includes a base; and an array of fastener projections extending integrally from a first surface of the base, the projections each including a stem portion of resin molded integrally with the first surface of the base, and a head portion disposed at a distal end of the stem portion and configured to releasably engage a complementary fastener element to form a fastening; wherein the stem portions of the fastener projections and at least a portion of the base are integrally formed of a single resin; and wherein at least a portion of the single resin of the base is in a foamed state.

31 Claims, 12 Drawing Sheets

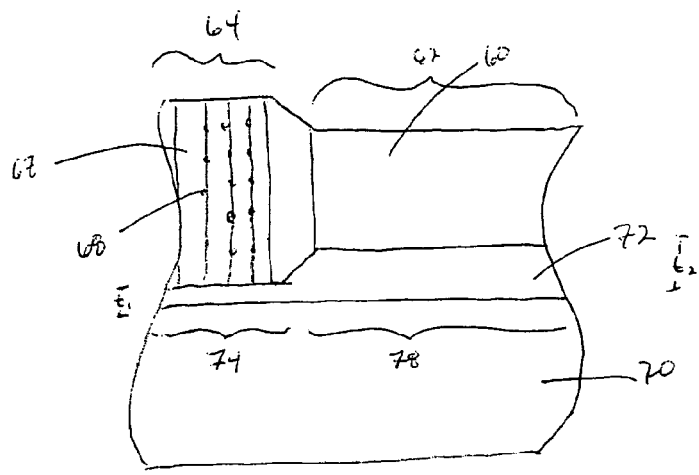
Fig. 5A
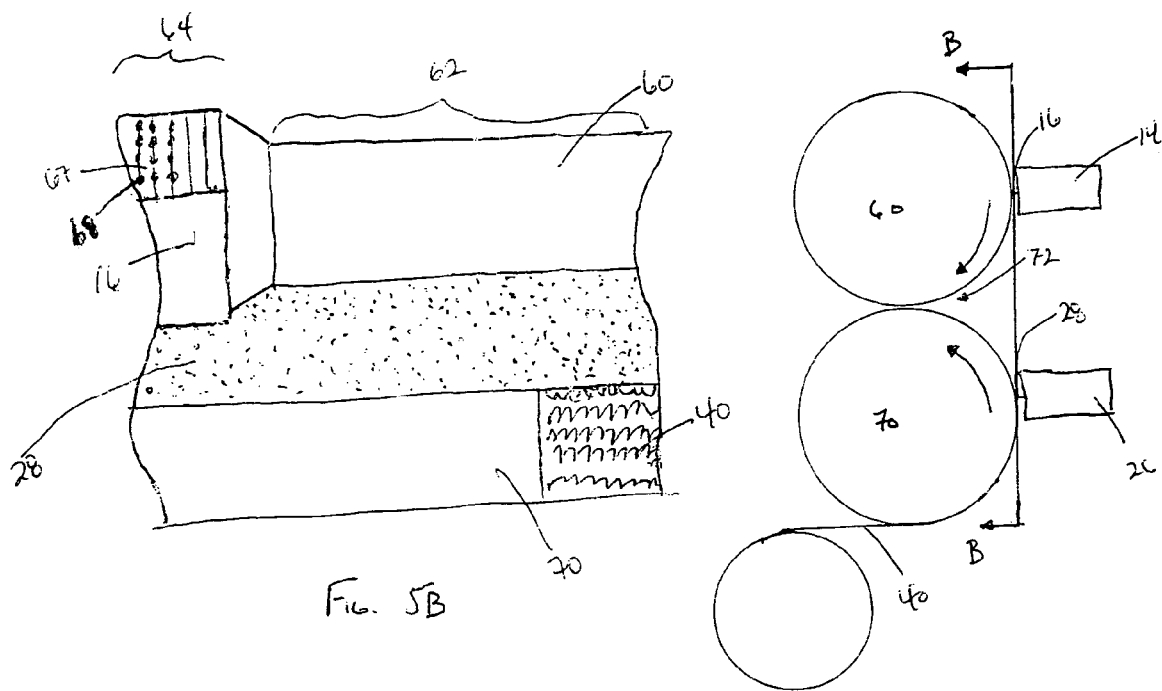
Fig. 5B
Fig. 5C

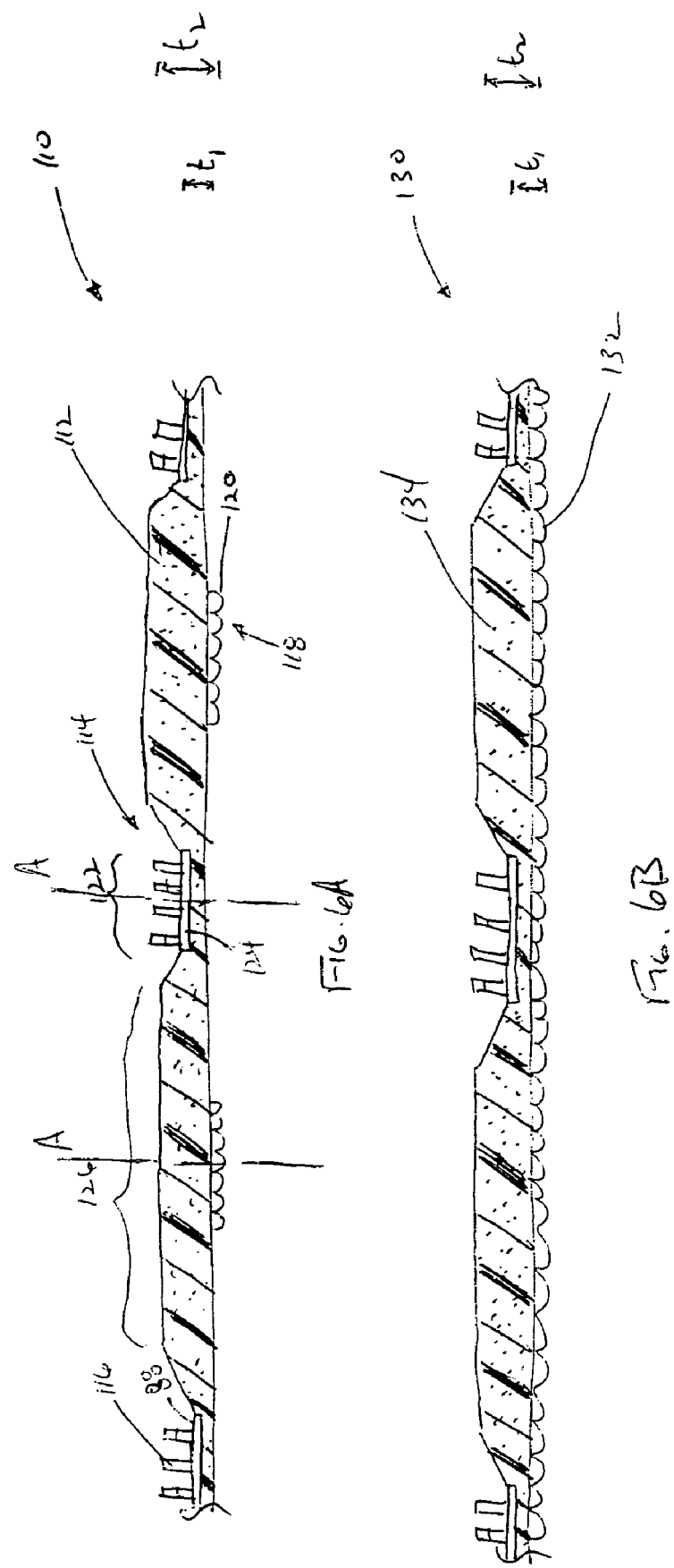

ARTICLES AND METHODS OF THEIR FORMATION

TECHNICAL FIELD

This invention relates to fastener products and their manufacture.

BACKGROUND

There has been much development over the last thirty years in the field of hook-and-loop fasteners. Early touch fastener products of this type consisted of two mating tapes, each being knit or woven. One tape would include loops of filament woven into a base, and the other would include filaments woven to form loops and then cut to form hooks. In some cases free ends of drawn plastic filaments on the male tape would be melted to form protruding heads.

More recently, continuous molding of fastener elements extending from a common sheet-form resin base has resulted in less expensive and thinner male tapes. Significant improvements in this area include the development of continuous fastener tape molding using fixed mold cavities (see Fischer, U.S. Pat. No. 4,794,028), and the ability to provide loops on the back side of the male fastener tape as the fastener tape substrate and elements are being formed (see Kennedy et al., U.S. Pat. No. 5,260,015), thus creating a composite fastener tape capable of fastening to itself.

SUMMARY

Touch fasteners and methods of making the same are described. In some instances, the touch fastener includes a molded base that includes a foamed portion. The foamed portion of the base can provide, for example, insulation.

In one aspect, the invention includes a fastener product including a base; and an array of fastener projections extending integrally from a first surface of the base, the projections each having a stem portion of resin molded integrally with the first surface of the base, and a head portion disposed at a distal end of the stem portion and configured to releasably engage a complementary fastener element to form a fastening. The stem portions of the fastener projections and at least a portion of the base are integrally formed of a single resin, and at least a portion of the single resin of the base is in a foamed state.

In some embodiments, the fastener product can include one or more of the following features. The foamed state can include a plastic foam. The single resin can include a foaming agent. The foaming agent can be present in the stem portions of the fastener projections in an unactivated state. The single resin can be in an unfoamed state in the stem portions of the fastener elements, and in a foamed state in at least a portion of the base. The base can also include a second resin. The fastener projections can be arranged in a band, the band of fastener projections having a width less than the width of the foamed state of the base. The fastener projections can be arranged in a patch of fastener projections. The foamed state can include an open cell foam, for example, one of a polyether foam or polyester foam. The foamed state can include a closed cell foam, for example a polyolefin such as polyethylene or polypropylene. The fastener projections can include heads that extend outwardly from stems in multiple directions. The fastener projections can include heads that extend outwardly from stems in one or more discrete direction. The foamed foamed state can have a specific gravity of at most about 1.1, for example at most about 0.7. The fastener projections can include fibers. The fibers can be secured to the foamed state by an adhesive. The fibers can form a nonwoven material. The nonwoven material can be stretched. The fibers can form a knit material. The fastener projections can be in the form of hook fastener elements, for example the hooks can have heads that extend outwardly from associated stems in multiple directions or the hooks can have heads that extend outwardly from associated stems in one or more discrete directions. The fastener projections can be integrally and continuously joined over an extended region to the base. The fastener projections can be joined over the extended region to the base without the use of an adhesive. The fastener projections can be joined over the extended region to the base with adhesive. The fastener projections can include cross-linked resin.

In another aspect, the invention features a fastener product including; a sheetform base having an array of individual fastener elements each having a stem integrally molded with and extending from an upper surface of the base; wherein the base includes a plurality of lanes, wherein a first lane comprises a selected resin in a foamed state and a second lane comprises the selected resin in an unfoamed state.

In some embodiments, the fastener product includes one or more of the following features. The first lane is disposed between two second lanes. The second lane includes a foaming agent. The resin in the foamed state includes a closed cell foam. The fastener elements include heads that extend outwardly from stems in multiple directions.

In another aspect, the invention features a method of forming a fastener product including a base and an array of fastener elements extending from the base. The method includes molding the base and stem portions of the fastener elements of a single resin; forming loop-engageable head portions on the stem portions of the fastener elements; and foaming at least a part of the single resin of the base.

In some embodiments the method includes one or more of the following features. The method can include generating gas bubbles in the resin in a part of the single resin of the base. The gas bubbles can be generated by activating a foaming agent within the resin. The fastener elements can be formed of a cross-linkable resin. For example, the cross-linkable resin can be cross-linked prior to foaming at least a part of the single resin of the base. In some embodiments, the resin can be cross-linked by irradiating the resin with an electron beam, for example irradiating the resin with ultraviolet light. The method can include foaming at least a part of the single resin of the base by applying thermal energy. The resin can include a polymer, for example a polyolefin, such as a polyolefin selected from a group consisting of polyethylene and polypropylene. In some embodiments, the base can be molded while molding the fastener elements, for example where the fastener elements are in the form of engageable hooks such as loop-engageable hooks. The loop-engageable head portions can be formed subsequent to the formation of the stems. The method can also include securing a field of fibers to the base, for example where the field of fibers are configured to engage hook fastener elements. The method can also include introducing molten resin to a gap defined adjacent a periphery of a rotating mold roll, such that the single resin forms at least a part of the base at the periphery of the mold roll and fills an array of fixed cavities defined in the rotating mold roll to form the fastener elements; solidifying the single resin; and stripping the single resin from the periphery of the mold roll by pulling the solidified fastener elements from their respective cavities. The single resin can be introduced in the form of multiple, spaced-apart bands. The single resin can be discontinuously introduced to the gap to form patches of projections extending from an associated base. The gap can be formed between the mold roll and a counter-rotating pressure roll. In some embodiments, the method includes foaming at least a part of the single resin of the base by activating a foaming agent within the single resin, for example where the foaming agent is activated before the single resin is introduced to the gap, where the foaming agent is activated while the single resin is introduced to the gap, or where the foaming agent is activated after the single resin is introduced to the gap. The foaming resin can be activated prior to stripping the single resin from the periphery of the mold roll. The foaming agent can be activated subsequent to stripping the single resin from the periphery of the mold roll. In some embodiments, the method includes foaming at least a part of the single resin of the base by charging the single resin with gas before the resin passes through the gap. The method can also include introducing a second resin to the gap to bond the second resin and the resin forming at least part of the sheet-form base at the periphery of the mold roll, the second resin including a foaming agent. For example, the method can include introducing a preformed substrate defining hook-engageable loops to the second resin to bond the substrate to the second resin. The substrate can be, for example, in the form of a discrete band and introduced to the second resin such that the second resin is exposed adjacent the discrete band of substrate. In some embodiments, foaming at least a part of the single resin of the base can include activating the foaming agent within the second resin. The cavities can be stem-shaped to form fastener element stems extending integrally from the base. In some embodiments, the method can also include post forming distal ends of the stems to form heads that overhang the base. The cavities can include head forming portions to form engageable fastener elements having heads that overhang the base and stems extending integrally from the base. The plastic foam can have a specific gravity of at most about 1.1, for example at most about 0.7.

In another aspect, the invention features a method for forming a fastener product including: securing a preformed sheet of foam material to a broad surface of a sheet-form base of a fastener component having an array of hook fastener elements including stems that extend outwardly from the base, the base being integrally and continuously joined over an extended region to the preformed sheet of foam material; and securing a mating fastener component to the preformed sheet of foam material, the mating fastener component having an array of fastener-engageable elements arranged to engage the hook fastener elements.

In some embodiments, the invention can include one or more of the following features. The preformed sheet of foam material can be secured to the broad surface of the base opposite a surface from which the hook fastener elements extend. Securing of the preformed sheet of foam material to the broad surface of the base can include flame laminating. The foam material can be selected from a group including foamed polyester and foamed polyether. The base and hook fastener elements can be formed of a thermoplastic resin. The foam material can have a specific gravity of less than about 1.1, for example, a specific gravity of less than about 0.7. The fastener-engageable elements can be loops of a loop material, for example a nonwoven material, a woven material, or a stretched nonwoven material. The fastener elements can have heads extending laterally from stems in multiple directions. The fastener elements can have heads that extend laterally from stems in one or more discrete directions. The fastener-engageable elements can be hook fastener elements.

In another aspect, the invention features a method of forming a sheetform fastener product including a sheetform base and an array of individual fastener elements each having a stem integrally molded with and extending from an upper surface of the base. The method includes extruding resin into a nip defined between a pressure surface and a rotating mold roll defining discrete cavities extending inwardly from an outer surface thereof; molding the sheetform base of the resin while molding at least the stems of the fastener elements in the cavities; and foaming a portion of the resin of the sheet-form base.

In some embodiments, the method includes one or more of the following features. The method can include extruding a second resin into the nip, wherein the second resin is foamed to provide the foam on the lower surface of the base. In some embodiments, the method includes introducing a material into the nip, wherein the material becomes secured to the foam on the lower surface of the base. In some embodiments, the method includes foaming at least a part of the single resin of the base by generating gas bubbles in the resin, for example, the gas bubbles can be generated by activating a foaming agent within the resin.

In another aspect, the invention includes a method of forming a sheetform fastener product including a sheetform base and an array of individual fastener elements each having a stem integrally molded with and extending from an upper surface of the base. The method includes extruding from an extruder having a contoured shape a resin as multiple lanes into a nip defined between a pressure surface and a rotating mold roll defining discrete cavities extending inwardly from an outer surface thereof, the multiple lanes including at least one lane of a first resin and another lane of a second resin; molding the sheetform base of the first and second resin while molding at least the stems of the fastener elements in the cavities of the first resin; and foaming the second resin.

In some embodiments, the second resin includes a foaming agent. In some embodiments, the second resin is foamed prior to entering the nip.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 5A-5C illustrate another method and apparatus for forming a web.

FIGS. 6A-6B illustrate various embodiments of a web.

Like reference symbols in the various drawings indicate like elements.

DETAILED DESCRIPTION

Figure 1:
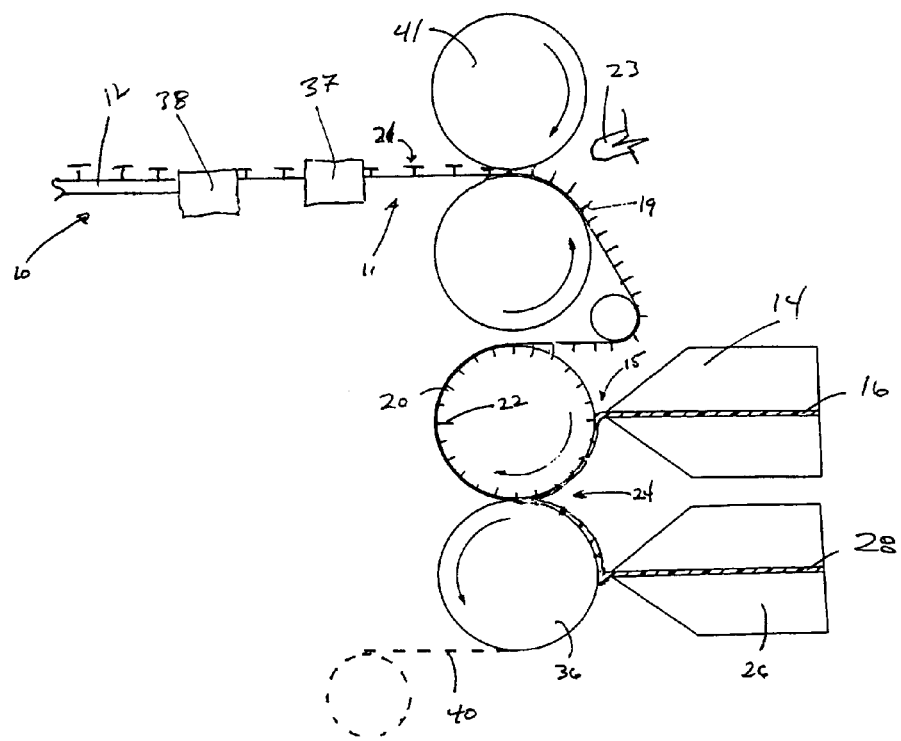
FIG. 1 is a method and apparatus for forming a web.

Various methods described below build upon the continuous extrusion/roll-forming methods for molding fastener elements on an integral, sheet-form base described by Fischer in U.S. Pat. No. 4,794,028, and/or the nip lamination processes described in Kennedy, et al. in U.S. Pat. No. 5,260,015, the details of both of which are incorporated herein by reference. The relative positions and sizes of the rolls and other components illustrated are schematic and are not to scale. Referring particularly to FIG. 1, a method and apparatus for forming a foam web 10 (see FIG. 1A) for use in forming, e.g., an insulating fastener product having a plastic foam backing material 12 is shown. An extruder 14 supplies a continuous sheet of molten resin 16 to a first gap 15 between the extruder 14 and a molding roll 20. Mold roll 20 contains an array of miniature, mold cavities 22 extending inward from its periphery for molding stems of fastener elements. The array of cavities 22 extends substantially about the entire periphery of mold roll 20. The extruder 14 can extrude resin 16 at a rate to force resin 16 to enter and at least partially fill the mold cavities 22, while excess resin forms a base substrate from which the fastener elements 21 extend, as further described below. Or, the extruder may simply deposit molten resin 16 on the surface of the mold roll 20. The resin 16 then enters a second gap 24 formed by molding roll 20 and pressure roll 36. Pressure in gap 24, depending on the amount of resin already within cavities 22, forces the resin 16 to enter and at least partially fill the mold cavities 22, while excess resin forms a base substrate from which stems 19 extend.

A second extruder 26 extrudes a foam forming polymer 28 (e.g., polyolefin, such as polyethylene, polypropylene) to another gap located between the second extruder 26 and the periphery of pressure roll 36. As a variation, extruder 14 may extrude polymer 28, the effect of which will be described in greater detail below in reference to FIG. 3. The rate of resin 16 and polymer 28 entering the respective gaps is controlled by gear pumps (not shown) that are positioned at the outlet of extruders 14 and 26, respectively. As resin 16 and polymer 28 simultaneously enter gap 24, the two materials are bonded, due to pressure in the gap, to form a multilayer web preform 11. The web cools on the mold roll 20 and the web preform 11 is stripped from the mold roll 20 by passing it around exit roll 34. Care should be taken to ensure that mold roll 20 and pressure roll 36 move at the same speed to prevent and/or reduce delamination of the foam web 10 as differential in roll speeds can cause shearing of resin 16, which can result in delamination.

Distal ends of the stems 19 are deformed by contact roller 41 to form hook fastener elements 21 having overhanging head portions capable of engaging mating fastener elements (e.g., loops, hooks). The overhanging head portions extend outwardly from respective stems 19 in multiple radial directions forming, e.g., mushroom-shaped hooks, flat-top hooks, etc. Alternatively, the overhanging heads can be formed by fastener element molding cavities (see FIG. 3, for an example) to form overhanging head portions that extend outwardly in one or more discrete directions (e.g., J-shaped hooks, L-shaped hooks, palm trees).

Prior to deformation using contact roller 41, the distal ends of the stems are preferably heated by heater 23. In these cases, the stems can be heated in a non-contacting process, such as by flame or hot wire, or in a contacting process, such as by heating the contact roller. A suitable non-contacting heating process is provided in U.S. Pat. No. 6,248,276, the entire contents of which are hereby incorporated by reference.

Polymer 28 contains a foaming agent that undergoes a chemical reaction at a particular activation temperature (e.g., greater than 300° F.). The foaming agent (e.g., pellets, powders) can be pre-blended within the polymer matrix prior to extrusion and/or the foaming agent can be added during the extrusion process, as examples, to form, e.g., a polymeric emulsion. Preferably, the amount of foaming agent added to the polymer 28 is between about ½ and 3 percent by weight, such as about 2 percent. However, the amount of foaming agent added can be higher or lower, depending on the intended end use for the product. When the foaming agent is heated above its activation temperature, a chemical reaction causes the foaming agent to release gas, such as carbon dioxide, that is used to expand the polymer 28 to form a foamed polymeric structure. The type of foaming agent employed varies depending on the parameters of the forming process and the end use of the product, including the resin material used. A suitable foaming agent is, for example, Hydrocerol® available from Clarient Technologies. In cases where the foaming agent is activated subsequent to fastener element (or stem) formation, it is important that the activation temperature of the foaming agent be greater than the extrusion temperature of the polymer 28 to prevent premature foaming of the polymer 28. In some cases, the activation temperature of the foaming agent is greater than the melting temperature of the molding resin 16. Preferably, by forming the fastener elements from a cross-linkable resin and by cross-linking the resin 16, the melting point of the resin is increased to a temperature greater than the activation temperature of the foaming agent. In many embodiments, polymer 28 is also cross-linkable.

Referring still to FIG. 1, web 11 is cross-linked (e.g., by electron beam, ultraviolet light) at station 37 to form adjacent chains of polymer thereby increasing the melting point of resin 16 and polymer 28 (in cases where polymer 28 is cross-linkable). The preformed fastener product is then directed to a heating station 38 where the base-forming polymer 28 containing the foaming agent is heated to a temperature sufficient to initiate the desired chemical reaction in the foaming agent. The softening point of the polymer 28 is low enough such that, at the activation temperature of the foaming agent, the polymer softens enough to allow expansion to occur. As the foaming agent releases gases or "blows", the cross-sectional thickness of the layer consisting of polymer 28 with foaming agent predictably increases to form a layer of foamed polymer bonded to a surface of molding resin 16. Because, as noted above, the molding resin 16 has been cross linked at station 37, deformation of the base substrate and fastener elements 21 due to heat is minimized. In some cases to minimize deformation of the fastener elements, heat can be selectively applied to polymer 28 at areas more removed from the fastener elements. For example, heat can be locally applied to a surface of web 11 opposite the surface from which the fastener elements extend.

FIG. 1 also shows a variation where a backing substrate 40 (shown by dashed lines) is also introduced to the gap 24. The backing substrate 40 is introduced to the gap 24 between a surface of pressure roll 36 and a surface of the polymer 28. Pressure in the gap 24 is sufficient to bond at least one surface of resin 16, polymer 28 and substrate 40 to an adjacent surface to form the three-layer laminate having a first layer that includes a resin base having an array of discrete fastener elements extending outwardly from the base, a second layer of polymer containing the foaming agent and a third layer forming a backing substrate having, for example, a hook-engageable material (e.g., a knit material, a nonwoven material, a woven material) that includes hook-engageable fastener elements extending outwardly from a bottom surface of the third layer. In some cases, as described with reference to FIG. 2, multiple, spaced apart bands (or one relatively narrow band) of backing material 40 is introduced.

As a variation on FIG. 1, the foam web can be formed in multiple stages. For example, a two-layer web preform can be formed and then a third layer can be affixed to form a three-layer web. To illustrate, fastener elements 21 having stems that extend from the resin base, can be formed on mold roll 20. Along with resin 16, polymer 28 including the foaming agent can also be introduced to the gap 24 thus bonding a surface of the fastener-forming resin 16 and polymer 28 to form a two layer web having a first layer including fastener elements 21 extending from a surface of the first layer, and a second layer including polymer 28 containing the foaming agent. The two-layer web, at a later stage, can then be bonded to a backing substrate by, for example, introducing the two-layer laminate and the backing substrate to a second gap to bond a surface of the two-layer substrate and a surface of the backing substrate to form a three-layer web. An adhesive layer can be used to secure the backing substrate to the two-layer web. The foaming agent of the second layer may or may not be activated prior to affixing the third layer. As an alternative, the polymer with foaming agent, activated or not, can first be bonded to the backing substrate at one side and then the molding resin can be bonded to the polymer with foaming agent at an opposing side. The molding resin can be bonded to the polymer while molding, e.g., fastener element stems, as described above, or the molding resin in the form of a sheet-form base having fastener element stems extending integrally therefrom can be bonded to the polymer subsequent to its formation using, for example, an adhesive.

In some cases, it is desirable to form a web having multiple, spaced apart bands (or a single band) of fastener elements extending from a surface of the web and/or spaced apart bands (or a single band) of plastic foam material and/or spaced-apart bands (or a single band) of substrate 40. In these cases, referring to FIG. 2 as an example, simultaneously with feeding in bands of backing material 40, thermoplastic resin 16 is fed into gap 15 by extruder 14 through spaced narrow width, slot die orifices so that the resin is provided as narrow, separated bands. As these bands of molten resin 16 pass into gap 15, the resin is forced into select cavities and molded, as described above. This produces spaced apart, parallel hook bands, or bands of stems that are later treated to form hooks on one side of the web (see FIG. 2A). Forming bands of fastener elements extending from a continuous web is described in greater detail in pending U.S. patent application Ser. No. 09/808,395, the entire contents of which are hereby incorporated by reference.

In some cases, it is desirable to form a web having discrete islands of fastener elements extending from a surface of the web (not shown). In these cases, a surface of the foam forming polymer can extend beyond the islands of fastener elements. Forming discrete islands of fastener elements extending from a continuous web is described in greater detail in pending U.S. Patent Application 60/554,234 and Ser. No. 10/803,682, both filed Mar. 18, 2004, the entire contents of which are hereby incorporated by reference.

Figure 1A:
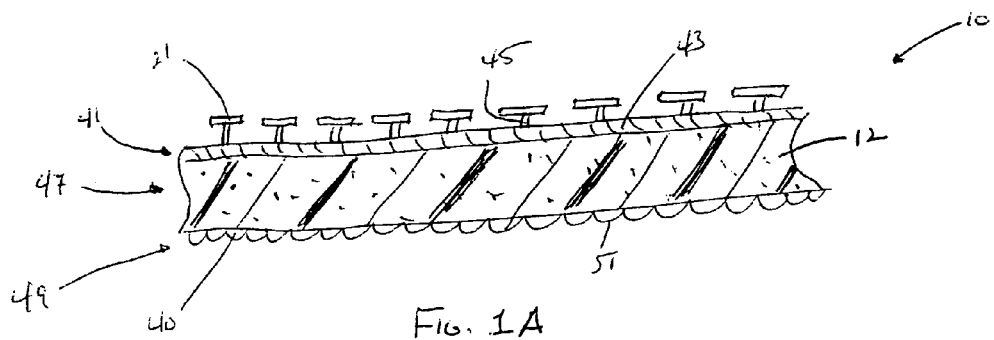
FIG. 1A illustrates an embodiment of a web including foam formed by the method and apparatus of FIG. 1.
Figure 2:
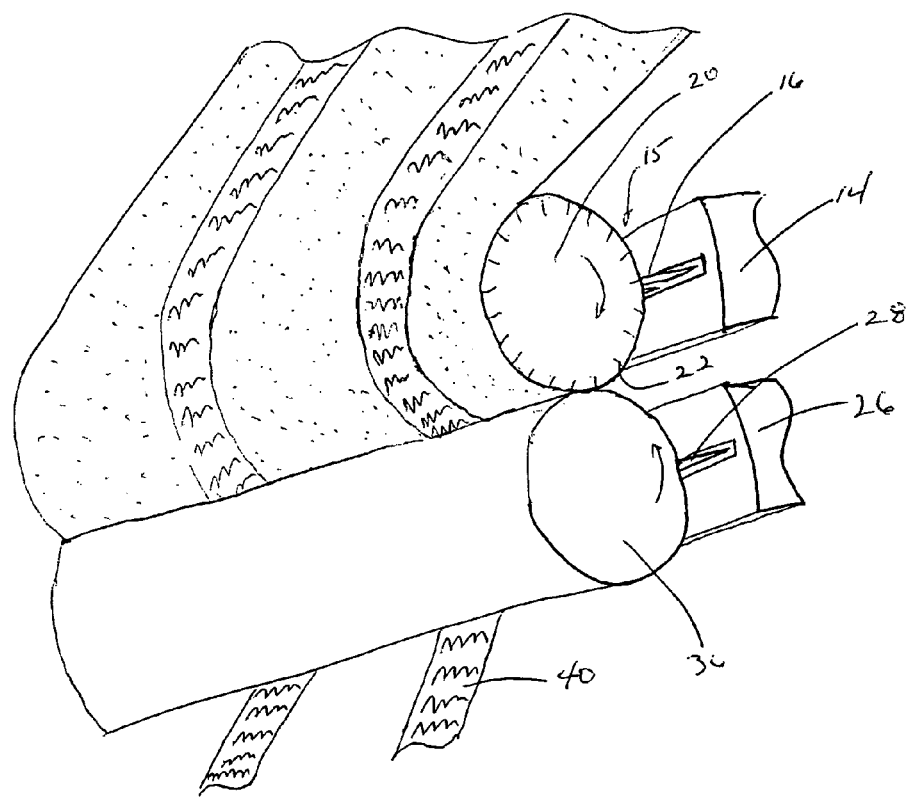
FIG. 2 is a method and apparatus for forming a web having bands of molding resin and bands of substrate.
Figure 2A:
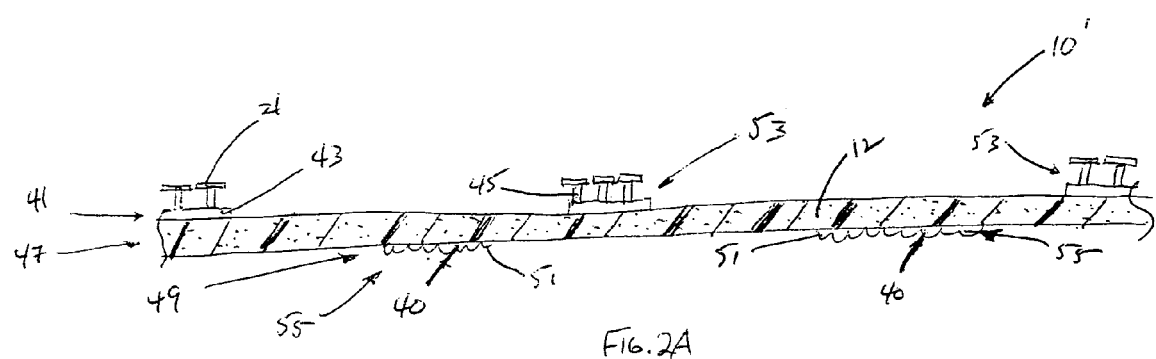
FIG. 2A illustrates an embodiment of a web including foam formed by the method and apparatus of FIG. 2.

Referring now to FIGS. 1A and 2A, foam webs 10 and 10', formed by the process illustrated by FIGS. 1 and 2, respectively, are shown having multiple fastener elements 21 extending from an upper surface of the foam web 10, 10' and a hook-engageable substrate 40 bonded to an opposite, lower surface. Foam web 10, 10' has three-layers: a first layer 41 having a sheet-like base 43 formed of resin with fastener elements 21 having stems 45 molded integrally with and extending from base 43, a second or intermediate layer 47 formed of a foam 12 preferably having a density less than a density of the resin forming base 43 (e.g., a specific gravity less than 1.1, less than 0.9, less than 0.7, less than 0.5, less than 0.3, from about 0.3 to about 1.1) and a third layer 49 formed of a hook-engageable material 40, such as a knit, woven fabrics, nonwoven fabric including stretched and unstretched nonwovens, that, in some embodiments, has an outer surface that remains pristine, free of resin 16, the loops 51 (or fibers) extending outwardly and capable of engaging hook fastener elements 21. Although fastener elements 21 in FIGS. 1A and 2A are flat-topped having head portions that extend outwardly in multiple directions, the fastener elements can also have, e.g., crooks that extend laterally in one or more discrete directions. Referring particularly to FIG. 2A, foam web 10' has parallel, spaced-apart bands 53 of molded fastener elements 21 and parallel, spaced-apart bands 55 of fastener-engaging loops 51.

In an alternative method of forming a touch fastener shown in FIG. 1A, a preformed fastener component is provided that includes a sheet-form base and an array of hook-shaped fastener elements integrally molded with and extending from the base. Fastener elements are formed by a continuous mold roll process employing fixed mold cavities such as described in Fischer U.S. Pat. No. 4,872,243, already incorporated by reference. Cavities can also be stem-shaped to form stem-shaped projections and post-formed to form overhanging heads. The fastener component is introduced to a nip defined between a pair of pressure rolls along with a preformed foam layer (e.g., polyester foam, polyether foam) and a hook-engageable substrate. The substrate includes a hook engageable material, such as woven fabrics, stretched or unstretched nonwovens, knits, etc., having mating elements sized to engage the fastener elements of the fastener component.

The foam layer is heated, preferably by flame, using heaters to facilitate the lamination process by softening the foam material prior to entering nip. Each of the fastener component, foam layer and substrate are then continuously introduced to nip formed by pressure rollers. At least one surface of each of the fastener component, foam layer and substrate is bonded to an adjacent surface to form the three-layer laminate. The lamination of layers can be done in a simultaneous manner or alternatively, can be done in stages.

Figure 3:
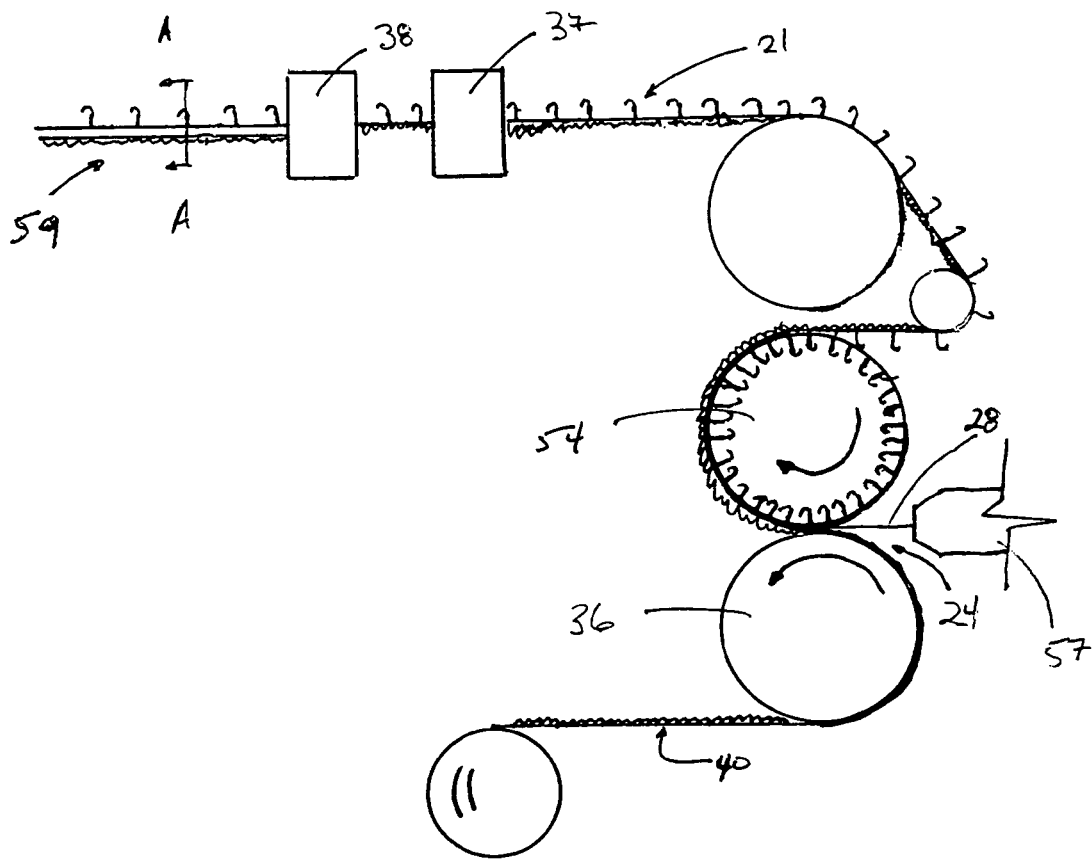
FIG. 3 is another method and apparatus for forming a web.
Figure 3A:
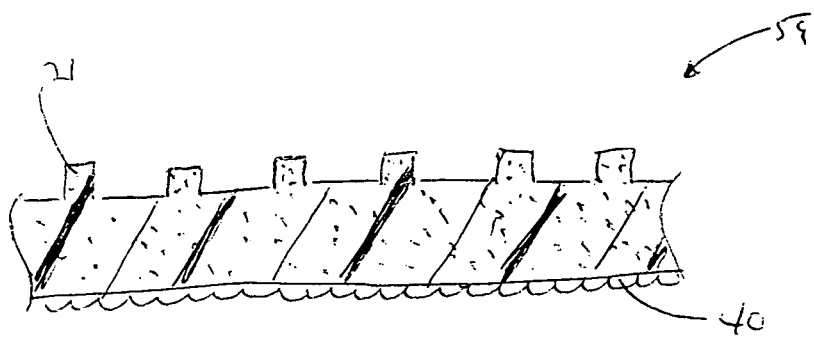
FIG. 3A illustrates an embodiment of a web including foam formed by the method and apparatus of FIG. 3.

Referring now to FIG. 3, another method and apparatus is shown for forming a multilayer web 59 including an insulating layer (see FIG. 3A). Polymer 28 including the foaming agent is continuously introduced to gap 24 between mold roll 54 and pressure roll 56 by extruder 57. Mold roll 54 contains an array of miniature, hook-shaped cavities 58 extending inwardly from its periphery for molding fastener elements 21 having overhanging heads that extend radially outward in a discrete direction forming hooks. Alternatively, as indicated above, the cavities can be stem-shaped to form only stem portions of fastener elements that can be post-formed to provide overhanging head portions.

A backing substrate 40 is also continuously introduced to gap 52 and is bonded to a surface of the base to form the web 59. The backing substrate 40 consists of a loop material having loop elements extending from a surface of the substrate 40. Other suitable substrates include knits, woven fabrics, stretched or unstretched nonwovens, as examples. In some embodiments, the backing material is applied subsequent to introducing polymer 28 to the nip (e.g., subsequent to stripping the polymer from the cavities, subsequent to activating the foaming agent). In some embodiments, an adhesive layer is used to affix substrate 40 to the polymer. Also, a web may be formed without backing substrate 40.

In this embodiment, polymer 28 is cross-linkable and, similar to the method of FIG. 1, the web is cross-linked at station 37 prior to heating at station 38 to increase the melting point of the polymer and to facilitate foam formation. Station 38 heats the foaming agent contained within polymer 28 thereby softening the polymer and activating the foaming agent to expand the polymer. Because fastener elements 21 also contain the foaming agent, the fastener elements expand. It is important that the geometry of the fastener elements not be impaired such that the expanded fastener elements can no longer effectively engage mating materials.

Figure 4:
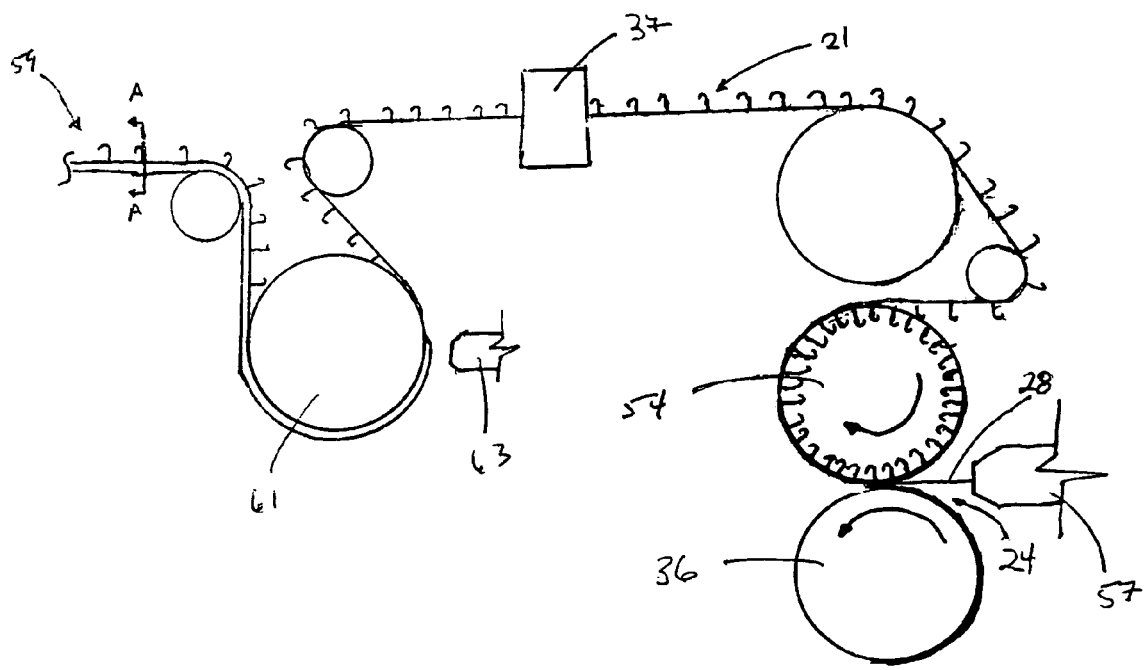
FIG. 4 illustrates another method and apparatus for forming a web.

As a variation, referring to FIG. 4, to reduce fastener element deformation due to the foaming process, polymer 28 can be heated as the preform web travels around a chilled roll 61. Preferably, this is accomplished by chilling chilled roll 61 to a temperature to maintain polymer 28 forming the fastener elements below the activation temperature of the foaming agent (e.g., less than 300° F.) and allowing polymer 28 forming the base to increase above the activation temperature of the foaming agent by applying heat using heater 63 to a surface of the base opposite the surface from which the fastener elements extend. Polymer 28 forming the base is allowed to expand to form a layer of foamed polymer having molded fastener elements extending integrally therefrom.

Figure 4A:
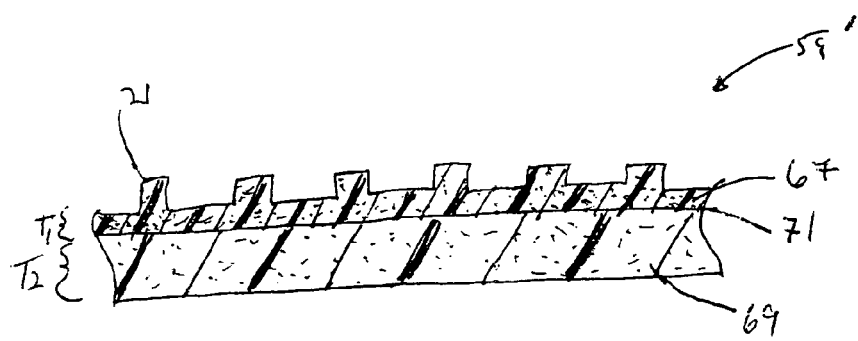
FIG. 4A illustrates an embodiment of a web including foam formed by the method and apparatus of FIG. 4.

The formed web 59', as shown by FIG. 4A, has a thickness $T_1$ of relatively greater density, due to its closer proximity to the chilled roll 61 during the heating process, forming a relatively solid base structure 67 from which stems of the fastener elements extend. A thickness $T_2$ of web 59' further removed from the periphery of roll 54 is foamed due to application of heat, as described above, forming a foamed base structure 69 of relatively lesser density. A transition 71 is located between the base structures 67, 69. The transition 71 can be smooth or abrupt depending on the forming conditions.

Figure 5D:
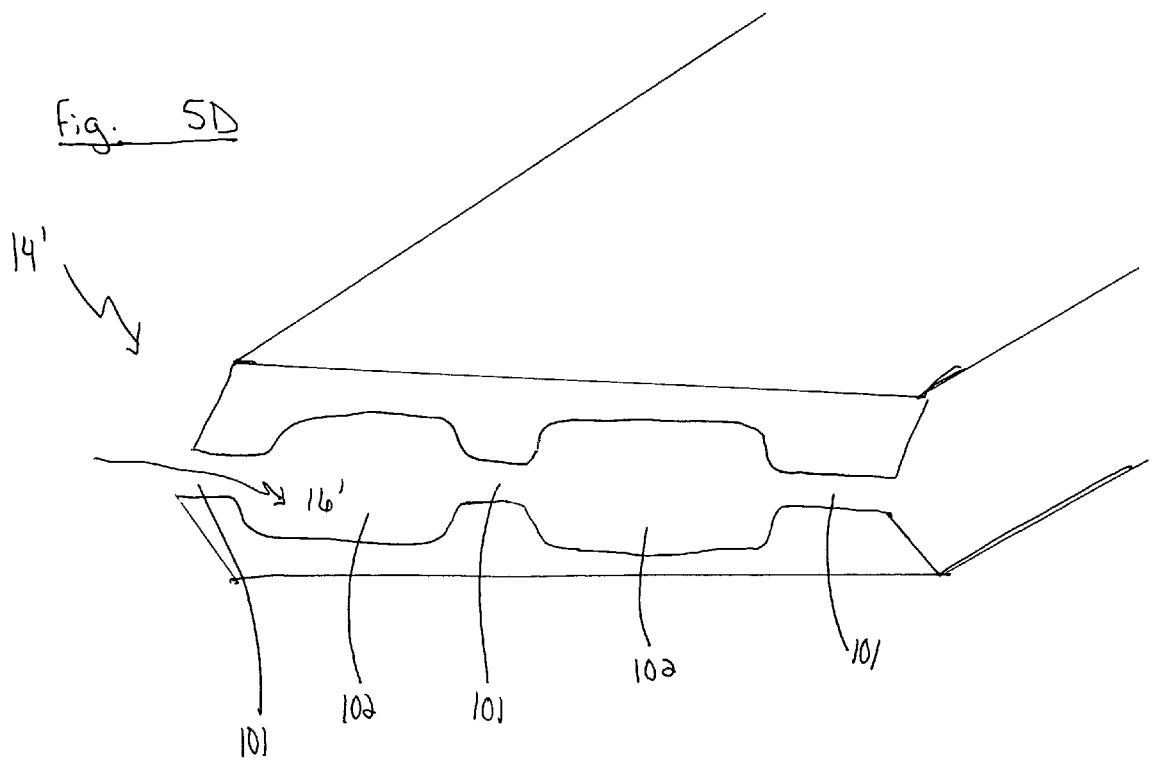
FIG. 5D illustrates a contoured extruder.

As noted above, in some cases, it may be desirable to foam polymer 28 before the polymer is introduced into the nip. Referring now to FIGS. 5A-5C, a mold roll 60 is shown having a region 62 of reduced diameter extending along the axis of the mold roll and region 64 of greater diameter. Within region 64, mold roll 60 is formed of a number of stacked mold rings 67 that form multiple molding cavities 68 (e.g., fastener element cavities, stem-shaped cavities). The diameters within regions 62 and 64 of mold roll 60 are sized such that when the mold roll is placed adjacent a pressure roll 70 a nip 72 is formed having region 74 of relatively narrower dimension $t_1$ and region 78 of relatively greater dimension $t_2$. Region 74 of narrower dimension forms a higher pressure zone that can reduce expansion of polymer 28 introduced within that region, while region 78 forms a lower pressure zone that allows for relatively greater expansion of polymer 28 introduced within that region. In some cases, the pressure roll has regions of greater diameter while the diameter of the mold roll is relatively constant.

Referring particularly to FIGS. 5B and 5C, a relatively narrow band of molten resin 16 and a relatively wider band of polymer 28 are extruded onto mold roll 60 and pressure roll 70, respectively, by a pair of extruders 14, 26 in a process similar to that described with reference to FIG. 1, above. Resin 16 is extruded onto the surface of mold roll 60 within region 64 of relatively greater diameter to at least partially fill mold cavities 68 while a relatively narrow band of substrate 40, carried by pressure roll 70, is introduced to nip 72. As in FIG. 1, polymer 28 is extruded onto pressure roll 70 and substrate 40 and polymer 28 is introduced to nip 72 between resin 16 and the substrate. Polymer 28 can be foamed before and/or as it is introduced to nip 72 to form a foam layer. In some cases, polymer 28 contains a foaming agent and the polymer is extruded above the agent's activation temperature. In some cases, the polymer is mechanically foamed (e.g., by charging the polymer with a gas, such as air) before and/or as the polymer is being introduced into nip 72. As polymer 28 travels through nip 72, within region 62, the polymer can expand due to the relatively low pressure in the resin within that region, while within regions 74 and 76, the polymer expands relatively less, due to the higher pressures in the polymer within those regions. Resin 16 bonds to an upper surface of polymer 28 while substrate 40 bonds to an opposite, lower surface.

As a variation on the process described in FIGS. 5A-5C, FIG. 5D refers to an extruder 14' having a contoured shape to extrude resin 16' having a varied thickness. The resin 16' extruded from the relatively narrower portion 101 of the extruder 14' is extruded into a relatively narrower portion of a corresponding nip (not shown), whereas the resin 16' extruded from the relatively wider portion 102 of the extruder 14' is extruded into a relatively wider portion of a corresponding nip (not shown). Preferably, resin foams as it leave the die, for example, allowing the resin to expand with a drop in pressure. The foamed resin 16' is then pulled into a nip where the thickness of the nip is less than the thickness of the foamed resin. The nip is then filled with the resin, causing the resin to form a skin, which provides a regular surface on the foamed resin 16'. In some portions of the nip, for example the portions corresponding to the relatively narrower portions of the extruder 101, the pressure is high enough to cause the resin 16' to fill at least a portion of the cavities of a mold roll.

Figure 5E:
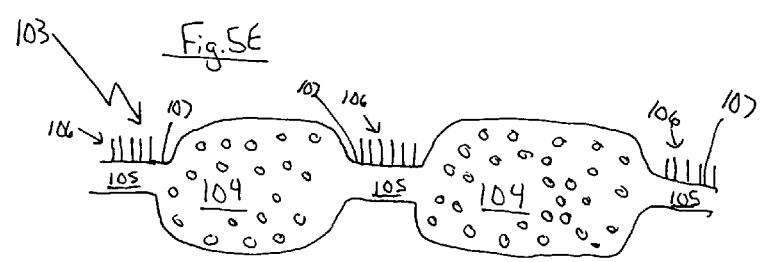
FIG. 5E illustrates an embodiment of a web formed using a contoured extruder.

FIG. 5E depicts a fastener product 103 formed using extruder 14'. The fastener product 103 includes a relatively thicker portion 104 corresponding to the relatively wider portion 102 of the extruder 14', and a relatively narrower portion 105 corresponding to the relatively narrower portion 101 of extruder 14'. Hooks 106 extend from the upper face 107 of the relatively narrower portion 105 of the fastener product 103. The base of the thicker portion 104 of the fastener product 103 is foamed.

In cases where the polymer, such as polyethylene or polypropylene, includes a foaming agent, it may be desirable to activate the foaming agent within the barrel of the extruder. This can be accomplished by heating the barrel to a temperature sufficient to increase the temperature of the foaming agent beyond the activation temperature. In some cases, it may also be desirable to heat a center portion of the barrel to a temperature (e.g., 425° F.) greater than a temperature at the ends of the barrel (e.g., 400° F.) to provide a temperature gradient for heating the polymer-agent mixture. To achieve suitable molded projections (e.g., hooks or stems), the outlet of the die can be sized to match the profile of the forming gap, e.g., between the mold roll and the pressure roll. Due to the swelling of the polymer as it foams, the profile of the extruded polymer as it enters the gap will be slightly larger than the size of the gap to provide sufficient material to enter the cavities. It should be noted, however, that extrusions having relatively large profiles may compress due to pressure within the gap, which can increase the density of the foamed polymer exiting the gap.

FIGS. 6A and 6B illustrate various examples of foam webs having fastener elements extending from opposite surfaces and a foam layer therebetween. Referring particularly to FIG. 6A, a web 110, formed by the apparatus of FIG. 5A, is shown having a widthwise continuous foam layer 112 that has parallel, relatively narrow bands of molded fastener elements 116 extending integrally from an upper surface of the web and parallel, relatively narrow bands 118 of fastener-engageable loops 120 extending outwardly from a lower surface of the web. As above, foam layer 112, in some embodiments, has a density less than the density of base 88 from which fastener elements 116 extend (e.g., a specific gravity less than 1.1, less than 0.9, less than 0.7, less than 0.5, less than 0.3, from about 0.3 to about 1.1). Within regions 122, fastener elements 116 extend integrally from a base 124 that is bonded to foam layer 112. Foam layer 112, within regions 122, has a thickness $t_1$ less than a thickness $t_2$ of the foam layer within adjacent regions 126, due to the differing pressures exerted on web 110 and, in some cases, the infiltration of solidified resin material into foam pores during the web's formation within the nip. In a variation, FIG. 6B shows a web 130 having a loop material 132 bonded to a foam layer 134 across substantially the entire width of the foam layer.

Figure 7:
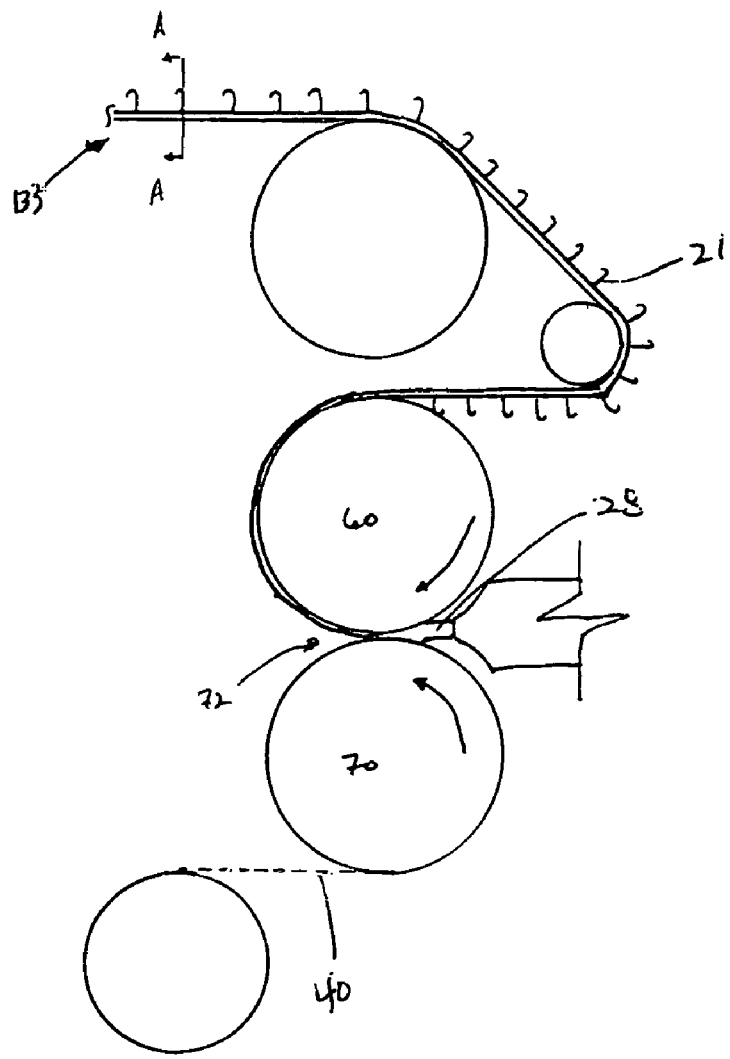
FIG. 7 illustrates a method and apparatus for forming a web.
Figure 7A:
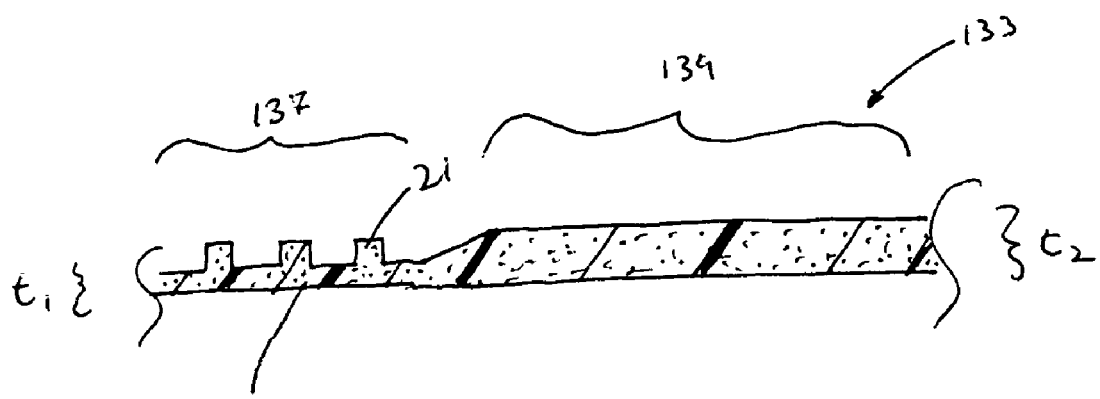
FIG. 7A illustrates an embodiment of a web including foam formed by the method and apparatus of FIG. 7.

As a variation on the process shown by FIGS. 5A-5C, polymer 28 can be used to form entire fastener elements or fastener element stems by at least partially filling mold cavities with the polymer while or just after foaming occurs. Referring to FIG. 7, using mold roll 60, polymer 28 can be used to form the fastener elements 21 or fastener element stems while or just after the polymer is foamed (e.g., mechanically, chemically) by exerting relatively high pressure on polymer 28 within region 74 of nip 72 (see FIG. 5A). The relatively high pressure compresses polymer 28 within region 74, to reduce expansion of polymer 28 within the high pressure region and cavities. By exerting relatively high levels of pressure on polymer 28, solidified fastener elements or fastener element stems can be stripped from mold roll 60 with little, if any deformation resulting from the foaming process. In some embodiments, a backing substrate 40 (shown by the dotted line) is introduced to the nip under conditions that it is bonded to the polymer 28. In some cases, backing substrate can be affixed (e.g., by adhesives, stitching) to polymer 28 downstream of the nip (not shown). Referring to FIG. 7A, a web 133 formed by the process of FIG. 7 is shown having an array of fastener elements 21 extending integrally from a base 135. Base 135, within region 137, has a thickness $t_1$ less than a thickness $t_2$ of the foam layer within an adjacent region 139 due to the differing pressures exerted on web 133 by roll 60 during its formation. In some embodiments, base 135 within regions 139 and/or 137 may have structures of relatively greater and lesser density and a transition between the two structures, similar to that depicted with reference to FIG. 4A. In some embodiments, region 139 has a density different from the density within region 137 (e.g., the density of the base within region 139 is less than the density within region 137).

Figure 8:
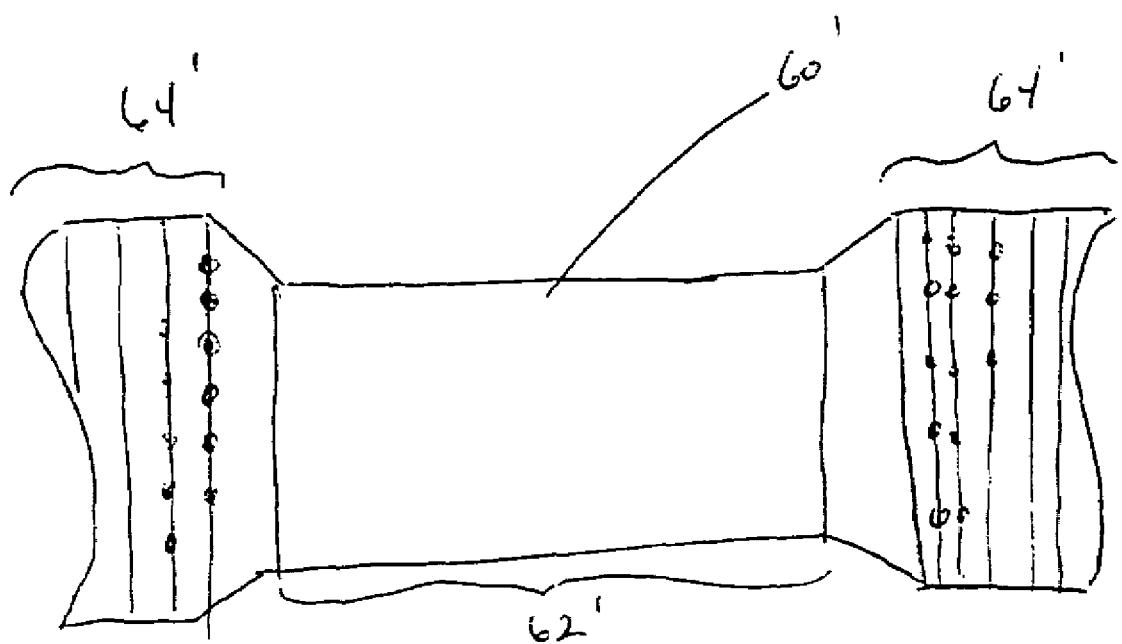
FIG. 8 shows another embodiment of a mold roll.

While FIGS. 5A-5C show mold roll 60 having only one region 64 of greater diameter, the number and location of regions 62 and 64 can be chosen as desired. For example, referring to FIG. 8, a mold roll 60' is shown that has multiple regions 64' of increased diameter tapering to region 62' of lesser diameter. In some embodiments, the transition between regions of greater and lesser diameter can be any other suitable shape, such as squared.

Figure 9:
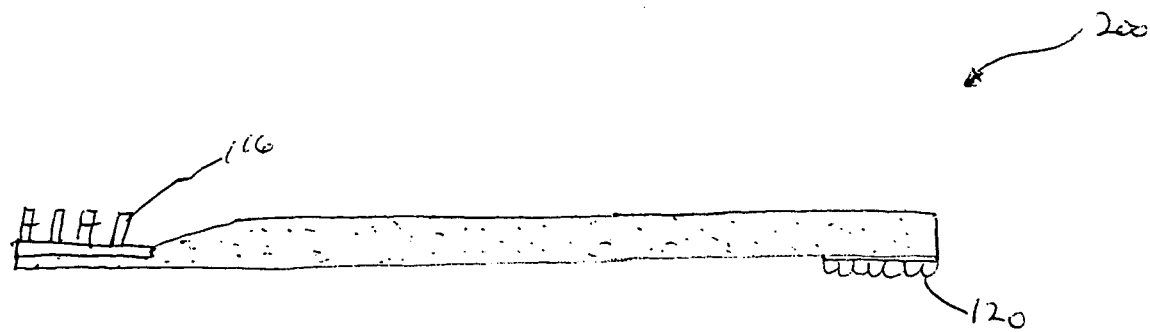
FIG. 9 illustrates an embodiment of a fastener product formed from the web of FIG. 6A.
Figure 10:
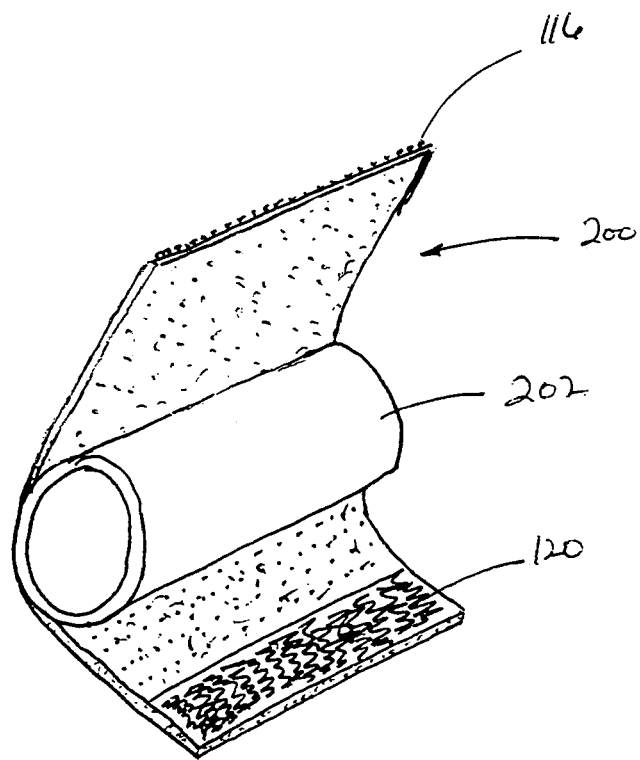
FIG. 10 illustrates the fastener product of FIG. 9 being wrapped about an object.

Referring now to FIG. 6A, by splitting web 110 along lines A and making appropriate cuts across the width, a self-engaging insulating fastener product 200 is formed (FIG. 9). There are many uses for such self-engaging insulating products. Referring to FIG. 10, fastener product 200 is being positioned about an object, such as a pipe. In some cases, insulating fastener product is used to bundle multiple objects together. Fastener product 200 is of sufficient flexibility to wrap about a periphery of the object (or objects) and of sufficient length to engage the mating fastener elements 116, 120. The flexibility and composite thickness of the fastener product 200 can be controlled depending on the materials selected and the manufacturing parameters employed. Fastener product 200, depending on the type of foam material used, can provide various types of insulation (e.g., thermal, sound). As an example, product 200 can be used to reduce noise from clanging pipes. As another example, insulating product 200 can be used to provide thermal insulation for a beverage container. In some cases, by using an open-cell foam, a "breathable" fastener product is formed to allow a gas, such as air, to pass through the foam layer. Alternatively, a closed-cell foam can be used to create a barrier to reduce the flow of gas through the foam layer. Suitable open-cell foam materials include, e.g., polyester foams, polyether foams. Suitable closed-cell foam materials include, e.g., polyolefin. The foam material can provide impact resistance to reduce the possibility of physical damage to an object. In some cases, the self-engaging product, due to the relatively low specific gravity of the foam material, can serve as a floatation device for an object secured by the product. In some embodiments, the self-engaging product can be used in medical applications, such as a medical wrap. The product may also be useful for bundling applications such as bundling electrical wires or cables during automobile manufacture.

Figure 11:
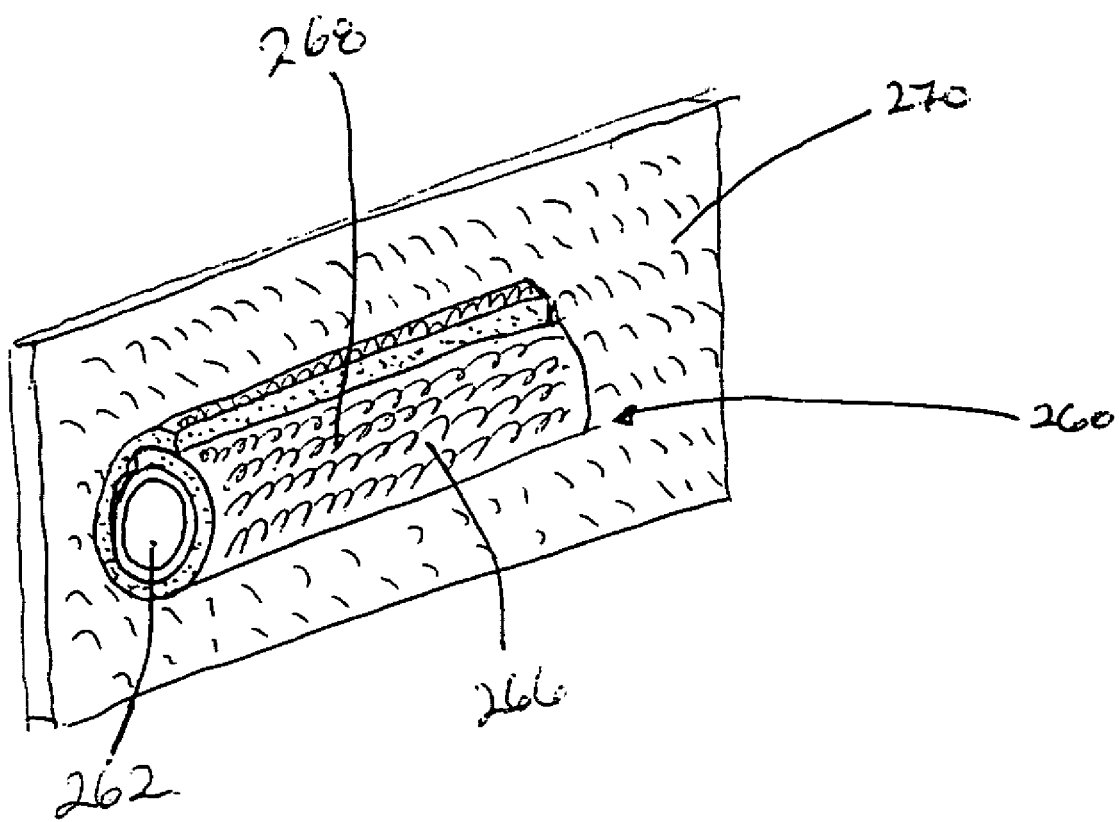
FIG. 11 illustrates another embodiment of a fastener product wrapped about an object and secured to a hook material.

FIG. 11 shows fastener product 260 being wrapped about cylinder 262 such that hook fastener elements 264 extend toward an outer surface of cylinder 262. Fastener product 260 is of sufficient length to wrap about cylinder 262 and to securely fasten using fastener elements 264 and hook-engageable material 266. By exposing the hook-engageable material, an outer surface 268 is provided having a relatively soft tactile feel. Exposed loops are secured to a mating hook material 270 to secure the cylinder thereto.

Figure 12:
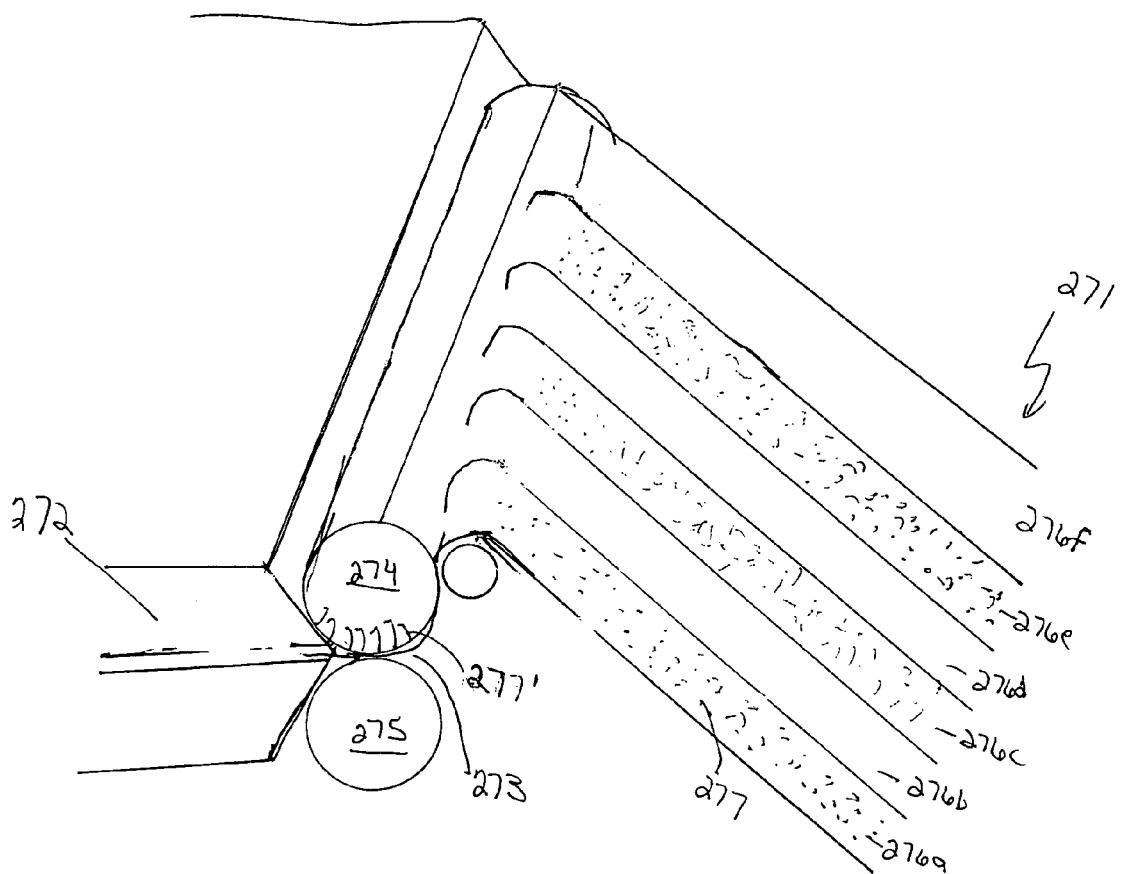
FIG. 12 illustrates a method an apparatus of forming a fastener product including lanes having fastener elements and lanes free of fastener elements.

FIG. 12 illustrates a fastener product 271 including multiple lanes of resin and a method of making the same. Multiple lanes of resin 276a-f are extruded from the extruder 272 into a gap 273 between mold roll 274 and pressure roll 275. Mold roll 274 includes sections corresponding to lanes of resins 276a-g. As depicted in FIG. 12, lanes 276b, 276d, and 276f correspond to portions of mold roll 274 that are free of hook forming cavities 277', whereas lanes 276a, 276c, and 276e correspond to portions of mold roll 274 that include hook forming cavities 277'. The resin in lanes 276b, 276d, and 276f includes a foaming agent, which is activated to provide a foamed portion of fastener product 271. The resin in lanes 276a, 276c, and 276e does not include a foaming agent. However, a portion of the resin in lanes 276a, 276c, and 276e is forced by pressure into hook forming cavities 277' to provide hooks 277. In some instances, the resin in the lanes 276a, 276c, and 276e is different from the resin in the lanes 276b, 276d, and 276f.

A number of embodiments of the invention have been described. Nevertheless, it will be understood that various modifications may be made without departing from the spirit and scope of the invention. Accordingly, other embodiments are within the scope of the following claims.

What is claimed is:

1. A fastener product comprising:
a seamless body of resin forming both a base and an array of fastener stems extending integrally from a first surface of the base;
head portions disposed at distal ends of the stems and configured to releasably engage a complementary fastener element to form a fastening;
wherein at least a portion of the seamless body of resin is in a foamed state; and
wherein a foaming agent is present in the stems in an unactivated state.

2. The fastener product of claim 1, wherein the foamed state comprises a plastic foam.

3. The fastener product of claim 1, wherein the head portions define hooks extending in a longitudinal direction and the stems having molded side surfaces substantially parallel to the longitudinal direction.

4. The fastener product of claim 3, wherein the base comprises a plurality of lanes, wherein a first lane comprises a first portion of the body of resin in the foamed state and a second lane comprises a second portion of the body of resin in an unfoamed state.

5. The fastener product of claim 1, wherein the body of resin is in an unfoamed state in the stems, and in a foamed state in at least a portion of the base.

6. The fastener product of claim 1, wherein the base further comprises a second body of resin.

7. The fastener product of claim 1, wherein the stems are arranged in a band, the band of stems having a width less than the width of the foamed state of the base.

8. The fastener product of claim 1, wherein the stems are arranged in a patch of stems.

9. The fastener product of claim 1, wherein the foamed state comprises an open cell foam.

10. The fastener product of claim 9, wherein the open cell foam comprises one of a polyether foam or polyester foam.

11. The fastener product of claim 1, wherein the foamed state comprises a closed cell foam.

12. The fastener product of claim 11, wherein the closed cell foam comprises a polyolefin.

13. The fastener product of claim 12, wherein the polyolefin is selected from a group consisting of polyethylene and polypropylene.

14. The fastener product of claim 1, wherein the heads extend outwardly from the associated stems in multiple directions.

15. The fastener product of claim 1, wherein the heads extend outwardly from the associated stems in one or more discrete direction.

16. The fastener product of claim 1, wherein the foamed state has a specific gravity of at most about 1.1.

17. The fastener product of claim 16, wherein the foamed state has a specific gravity of at most about 0.7.

18. The fastener product of claim 1, wherein the stems comprise fibers.

19. The fastener product of claim 18, wherein the fibers are secured to the foamed state by an adhesive.

20. The fastener product of claim 18, wherein the fibers form a nonwoven material.

21. The fastener product of claim 20, wherein the nonwoven material is stretched.

22. The fastener product of claim 18, wherein the fibers form a knit material.

23. The fastener product of claim 1, wherein the stems and the heads together form hook fastener elements.

24. The fastener product of claim 23, wherein the heads extend outwardly from the associated stems in multiple directions.

25. The fastener product of claim 23, wherein the heads extend outwardly from the associated stems in one or more discrete directions.

26. The fastener product of claim 1, wherein the stems comprise cross-linked resin.

27. A fastener product comprising:
a seamless body of resin forming both a sheetform base and an array of individual fastener elements each having a stem integrally molded with and extending from an upper surface of the base;
wherein the base comprises a plurality of lanes, wherein a first lane comprises a first portion of the body of resin in a foamed state and a second lane comprises a second portion of the body of resin in an unfoamed state; and
wherein a foaming agent is present in the stems in an unactivated state.

28. The fastener product of claim 27, wherein the first lane is disposed between two second lanes.

29. The fastener product of claim 27, wherein the second lane comprises a foaming agent.

30. The fastener product of claim 27, wherein the portion of the body of resin in the foamed state comprises a closed cell foam.

31. The fastener product of claim 27, wherein the fastener elements include heads that extend outwardly from stems in multiple directions.

* * * * *